No. 885,126. PATENTED APR. 21, 1908.
E. N. YARBROUGH.
FERTILIZER DISTRIBUTER.
APPLICATION FILED NOV. 5, 1907.
2 SHEETS—SHEET 1.
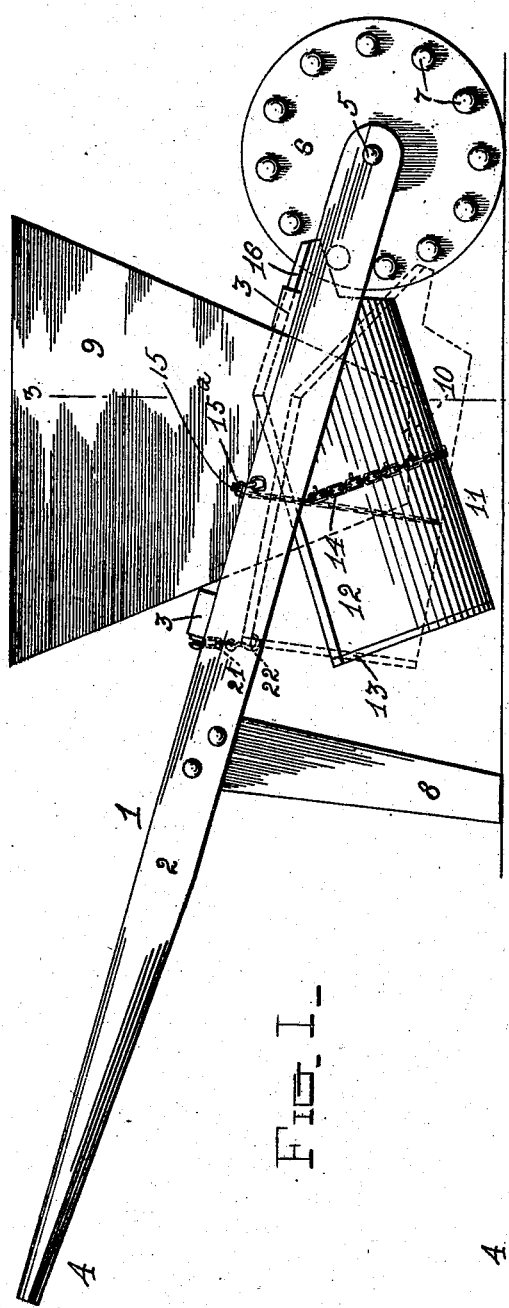
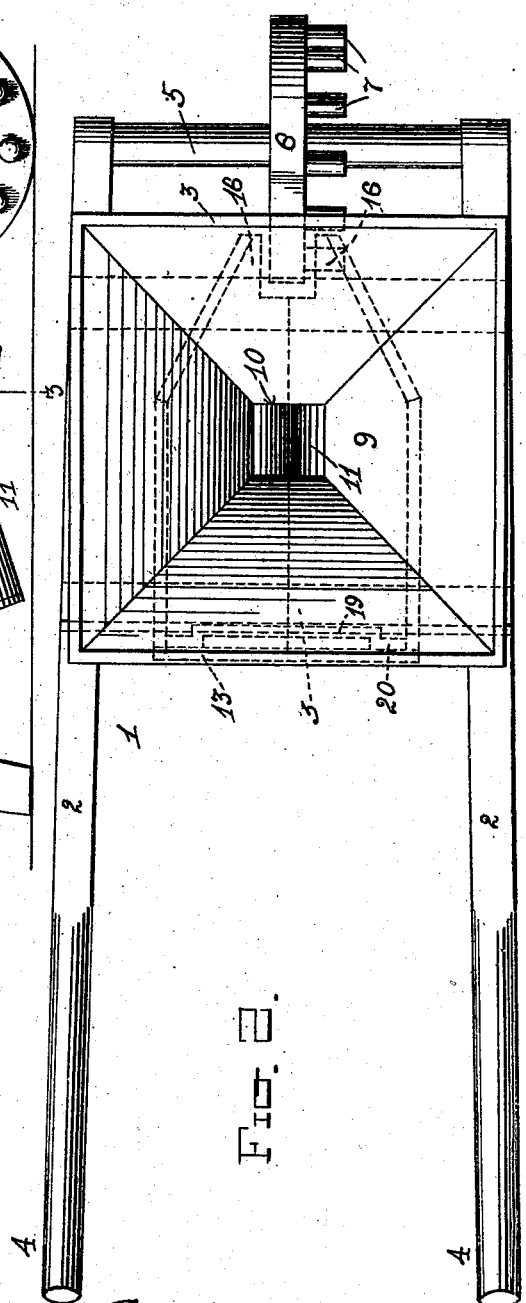
Witnesses
J. Milton Jester
L. O. Little
Inventor
E. N. Yarbrough
By Watson E. Coleman
Attorney No. 885,126. PATENTED APR. 21, 1908.
E. N. YARBROUGH.
FERTILIZER DISTRIBUTER.
APPLICATION FILED NOV. 5, 1907.
2 SHEETS—SHEET 2.
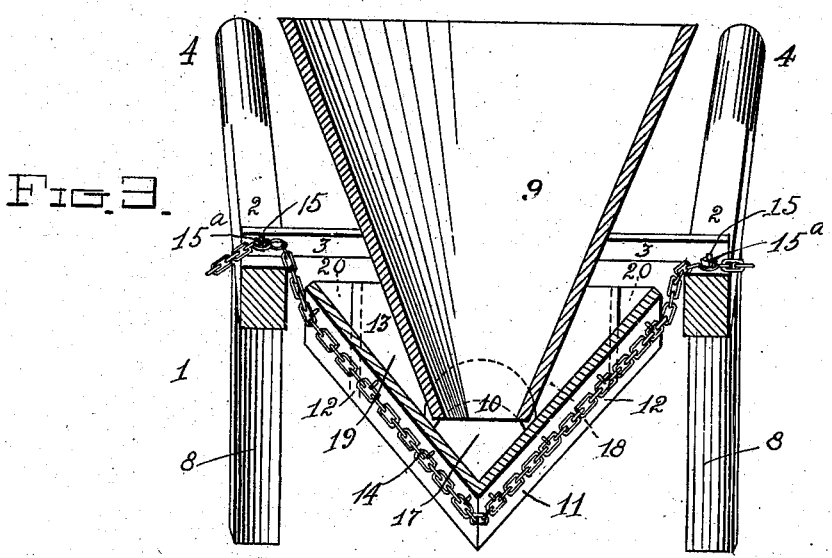
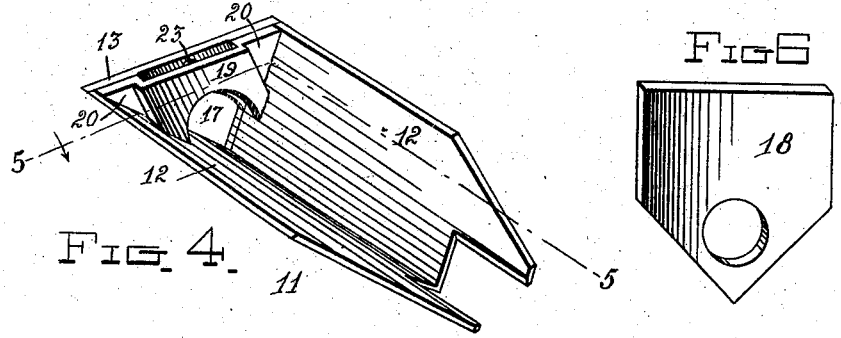
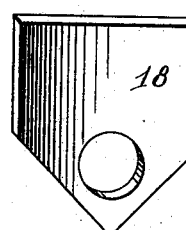
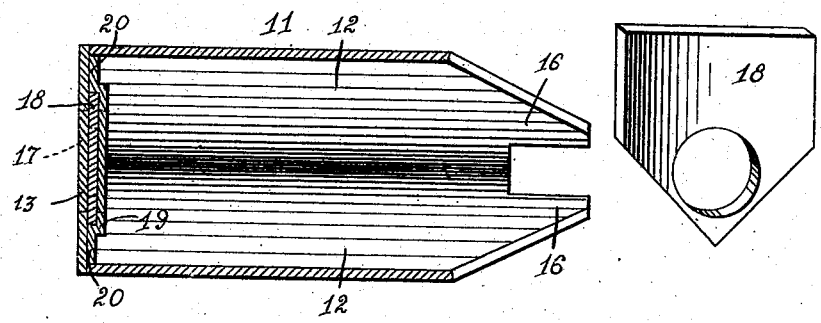

UNITED STATES PATENT OFFICE.

EBIN N. YARBROUGH, OF OKOLONA, ARKANSAS.

FERTILIZER-DISTRIBUTER.

No. 885,126.        Specification of Letters Patent.        Patented April 21, 1908.

Application filed November 5, 1907. Serial No. 400,869.

*To all whom it may concern:*

Be it known that I, EBIN N. YARBROUGH, a citizen of the United States, residing at Okolona, in the county of Clark and State of Arkansas, have invented certain new and useful Improvements in Fertilizer-Distributers, of which the following is a specification, reference being had to the accompanying drawings.
My invention relates to improvements in fertilizer distributers and consists of the novel construction and the combination of parts hereinafter described and claimed.

The object of the invention is to provide a device of this character which will be simple, strong, durable and inexpensive in construction and which may be conveniently moved over a field to distribute fertilizer in an even or continuous stream.
Another object of the invention is to provide an improved means whereby the quantity of fertilizer dropped by the device may be readily regulated.

The above and other objects are attained in the construction illustrated in the accompanying drawings, in which Figure 1 is a side elevation of my improved fertilizer distributer; Fig. 2 is a top plan view; Fig. 3 is a vertical transverse section taken on the plane indicated by the line 3—3 in Fig. 1; Fig. 4 is a perspective view of the dropping shoe; Fig. 5 is a detail section taken on the plane indicated by the line 5—5 in Fig. 4; and Fig. 6 represents two of the feed regulating plates or slides showing the same provided with outlet openings of different sizes.

The preferred embodiment of the invention illustrated in the drawings is in the form of a wheel barrow and consists of a main frame 1 having two side bars 2 connected by spaced cross bars 3. The side bars 2 are substantially parallel and their rear ends are tapered to provide handles 4. Journaled in suitable bearings in the front ends of the bars 2 is the axle 5 of a supporting and tappet wheel 6 from one face of which latter projects a plurality of tappets 7 in the form of pins or studs which project laterally and are arranged in an annular row or series concentric with the axle. Depending from the side bars 2 at a suitable distance from their front ends are supporting legs 8 which co-act with the wheel 6 to support the device when not in use. Arranged between and secured to the cross bars 3 is a hopper 9 for the fertilizer. This hopper is preferably in the form of an inverted pyramid having substantially V-shaped sides spaced apart at their small lower ends to provide a discharge or outlet opening 10 for the fertilizer. Hung beneath said opening is an oscillating hopper bottom or shoe 11 of substantially V-shape in cross section, the same being formed by two angularly arranged side pieces 12 connected at their rear ends by a V-shaped cross piece or plate 13.

The shoe or bottom 11 is suspended for rocking or oscillatory movement by a chain 14 which is passed across and secured to the lower faces of the side pieces 12 and has its two ends adjustably secured, preferably, by engaging its links with screw studs 15 which project from the upper faces of the side bars 2, said links being retained upon the studs by nuts 15$^a$ as clearly shown in the drawings.

The forward ends of the side pieces 12 of said shoe have their upper edges beveled downwardly and their lower edges recessed to provide spaced arms 16 adapted to receive the rim of the wheel 6 between them and one of which is adapted to be engaged and actuated by the tappets 7 on said wheel. Owing to this construction it will be seen that when the wheel barrow is moved forwardly the tappets 7 will successively engage the under face of one of the arms 16 and elevate the latter until it slips off of the same and drops down upon the next tappet. This movement of the arm causes the bottom or shoe 12 to be oscillated to work the fertilizer falling into it from the hopper out through a discharge opening or outlet 17 formed in the end plate 13. For the purpose of enabling any predetermined quantity of fertilizer to be dropped upon an acre or other piece of ground of known area I preferably employ a plurality of feed controlling plates 18 which have discharge or outlet openings of different sizes and any one of which is adapted to be placed against the plate 13 with its opening in register with the opening 17. These controlling plates are indicated by the numeral 18 and two of them are shown in Fig. 6, but it will be understood that any number of them may be provided for use with each device and that their openings may be of such sizes as will allow predetermined quantities of fertilizer per acre to be dropped by the device.

The plate 18 may be removably secured to the end piece 13 in any suitable manner but I preferably make them in the form of slides which have V-shaped lower ends and which are adapted to slide between the inner face of the plate 13 and a guide plate 19 having an off set and recessed central portion and end flanges 20 which are soldered or otherwise secured to the plate 13 as more clearly shown in Figs. 4 and 5. For the purpose of enabling the hopper bottom or shoe 11 to be held with its arm 16 out of the path of the tappets 7 on the wheel 6 so that the device may be moved from one point to another without dropping fertilizer, I preferably provide a suspending chain or similar element 21 and attach its upper end to the center of the rear cross bar 3. On the lower end of said chain is a hook 22 adapted to be readily engaged with or disengaged from an aperture 23 in the center of the upper portion of the plate 13.

From the foregoing it will be seen that by constructing the wheel barrow frame of the two side pieces and the two cross bars and arranging the hopper between them and suspending the rocking bottom or shoe beneath said hopper and from said side bars, a very simple and inexpensive construction is provided and one which will be exceedingly strong and durable. It will also be noted that the construction of the hopper bottom or shoe and its manner of mounting are such as will enable these parts to be readily produced at a small cost. The provision of the feed controlling or regulating plates enables the quantity of fertilizer dropped by the machine to be quickly, easily and accurately varied.

While I have shown and described my invention as in the form of a wheel barrow adapted to be pushed over a field, it will be understood that it may be mounted on supporting wheels so that it may be drawn by a draft animal or animals, and that various other changes in the form, proportion and minor details of construction may be made without departing from the spirit or sacrificing any of the advantages of the invention as defined by the appended claims.

Having thus described my invention what I claim is:

1. A fertilizer distributer of the wheel barrow type comprising side bars having handles at their rear ends, spaced cross bars connecting said side bars, supporting legs depending from the side bars, a supporting and tappet wheel having its axle journaled in the forward ends of said side bars, said wheel having an annular series of tappet pins projecting from one of its faces, a hopper supported between said cross bars and having a tapered lower end, an oscillatory bottom or shoe arranged beneath the hopper, chains for loosely suspending said shoe from said side bars, spaced arms upon the front end of the shoe to receive said wheel, one of said arms projecting normally into the path of the tappet pins, an apertured end piece upon said shoe, guides upon said end piece, and an apertured controlling plate removably engaged with said guides and adapted to have its aperture or opening register with the one in said end piece, substantially as described.

2. In a fertilizer distributer, a frame having side bars, a tappet wheel arranged therein and having projecting from one of its faces an annular series of tappet pins, a hopper supported in the frame and having an open tapered lower end, a rocking bottom or shoe arranged beneath the open lower end of the hopper and loosely suspended from the side bars of the frame for oscillatory movement said bottom or shoe consisting of two angularly disposed side pieces united at their bottom edges and an end piece connecting said side pieces at their rear ends, said end piece being formed with a discharge opening, the forward end of the side pieces being notched and beveled to provide the spaced arms 16, one of the latter being adapted to engage the tappets on said wheel, a guide arranged upon said end piece of the bottom or shoe and a regulating plate or slide adapted to engage said guide and formed with an opening to register with the opening in said end piece.

3. In a fertilizer distributer, a frame having side bars and connecting cross bars, a hopper supported upon the cross bars and having an open tapered lower end, a tappet wheel arranged between the side bars, a rocking bottom or shoe arranged beneath the hopper and having an arm to engage the tappets on said wheel, screw studs projecting upwardly from said side bars, suspending chains attached to the bottom or shoe and having their links engaged with said screw studs, and nuts upon the latter for retaining the links thereon.

4. In a fertilizer distributer, a frame having side bars and connecting cross bars, a hopper supported upon the cross bars and having an open tapered lower end, a tappet wheel arranged between the side bars, a rocking bottom or shoe arranged beneath the hopper and having an arm to engage the tappets on said wheel, said bottom or hopper having an end piece formed with a discharge opening and with an aperture, and a hook loosely suspended from the rear cross bar and adapted to engage the aperture in the end piece of the bottom or shoe to support the latter in an inoperative position with its arm out of the path of the tappets on said wheel.

In testimony whereof I hereunto affix my signature in the presence of two witnesses.

EBIN N. YARBROUGH.

Witnesses:
F. A. HUGHES,
J. E. YOUNG.